US010122831B2

(12) United States Patent
Adachi et al.

(10) Patent No.: US 10,122,831 B2
(45) Date of Patent: Nov. 6, 2018

(54) METHOD FOR COMPRESSING AND RECONSTRUCTING DATA SAMPLED FROM CONTINUOUS FUNCTIONS

(71) Applicant: HERE Global B.V., Eindhoven (NL)

(72) Inventors: Jeffrey Adachi, El Carrito, CA (US); Xiaoqing Liu, El Cerrito, CA (US)

(73) Assignee: HERE Global B.V., Eindhoven (NL)

( * ) Notice: Subject to any disclaimer, the term of this patent is extended or adjusted under 35 U.S.C. 154(b) by 62 days.

(21) Appl. No.: 14/084,032

(22) Filed: Nov. 19, 2013

(65) Prior Publication Data
US 2015/0142990 A1 May 21, 2015

(51) Int. Cl.
| | |
|---|---|
| *G06F 15/16* | (2006.01) |
| *H04L 29/06* | (2006.01) |
| *H04L 29/08* | (2006.01) |
| *G06F 17/17* | (2006.01) |
| *G01C 21/34* | (2006.01) |

(52) U.S. Cl.
CPC .......... *H04L 69/04* (2013.01); *G01C 21/3492* (2013.01); *G06F 17/17* (2013.01); *H04L 67/10* (2013.01)

(58) Field of Classification Search
CPC ........................... H04L 29/0604; H04L 29/06; H04L 29/08072
USPC .......................................................... 709/247
See application file for complete search history.

(56) References Cited

U.S. PATENT DOCUMENTS

| | | | | | |
|---|---|---|---|---|---|
| 5,155,490 | A | * | 10/1992 | Spradley, Jr. ........... | G01S 19/04 342/357.44 |
| 5,825,326 | A | * | 10/1998 | Semler .................... | G01S 19/37 342/357.27 |
| 6,324,474 | B1 | * | 11/2001 | Beisner ................... | G01S 19/07 342/357.31 |
| 7,865,954 | B1 | * | 1/2011 | Phoha ................. | H04L 63/1466 709/224 |
| 2003/0154310 | A1 | * | 8/2003 | David ............... | H04B 7/18595 709/249 |
| 2009/0172118 | A1 | * | 7/2009 | Lee ......................... | H04L 51/14 709/206 |
| 2009/0216704 | A1 | * | 8/2009 | Zheng .................... | G01C 21/20 706/52 |
| 2010/0082235 | A1 | * | 4/2010 | Dicke ............... | G01C 21/3446 701/467 |

(Continued)

OTHER PUBLICATIONS

"Invertible Matrix", Wikipedia, Retrieved on May 2, 2014, Webpage available at : http://en.wikipedia.org/wiki/Invertible_matrix.

(Continued)

*Primary Examiner* — Vivek Srivastava
*Assistant Examiner* — Atta Khan
(74) *Attorney, Agent, or Firm* — Alston & Bird LLP

(57) ABSTRACT

A method comprises obtaining data points, each comprised of a time stamp and measurement; dividing the data points into sequences of consecutive data points; limiting the maximum time between consecutive data points in the same sequence; limiting the maximum time between the earliest and latest data points in each sequence; calculating a polynomial of lowest transmission cost for each sequence; limiting the approximation error between the data points in a sequence and the associated polynomial; and transmitting, to a server, data based on the calculated polynomial.

20 Claims, 3 Drawing Sheets

(56) References Cited

U.S. PATENT DOCUMENTS

| | | | |
|---|---|---|---|
| 2010/0085249 A1* | 4/2010 | Ferguson | G01S 19/04 |
| | | | 342/357.41 |
| 2012/0016574 A1* | 1/2012 | Smartt | G08G 1/20 |
| | | | 701/117 |
| 2012/0221244 A1* | 8/2012 | Georgy | G01C 21/165 |
| | | | 701/472 |

OTHER PUBLICATIONS

"Taylor Series", Wikipedia, Retrieved on May 2, 2014, Webpage available at : http://en.wikipedia.org/wiki/Taylor_series.

"Fourier Series", Wikipedia, Retrieved on May 2, 2014, Webpage available at : http://en.wikipedia.org/wiki/Fourier_series.

Sanders, "Network Forensics Analysis Using Piecewise Polynomials", The Tower, vol. 2, Issue 01, 2010, pp. 25-36.

Sanders et al., "Reducing Traffic Traces Using a Polynomial Approximation for Traffic Classification", Proceedings of IEEE Southeastcon, Mar. 17-20, 2011, pp. 55-58.

"Conversion of Geodetic Coordinates to the Local Tangent Plane", Latitude to Local Tangent, Version 2.01, Sep. 15, 2007, pp. 1-4.

Zheng et al., "Computing with Spatial Trajectories", Springer, Jul. 2011, pp. 6-33.

Koegel et al., "Compact Vehicular Trajectory Encoding", IEEE 73rd Vehicular Technology Conference, May 15-18, 2011, pp. 1-5.

Kolesnikov, "Efficient Online Algorithms for the Polygonal Approximation of Trajectory Data", 12th IEEE International Conference on Mobile Data Management (MDM), vol. 1, Jun. 6-9, 2011, pp. 49-57.

Koegel et al., "A Comparison of Vehicular Trajectory Encoding Techniques", The 10th IFIP Annual Mediterranean Ad Hoc Networking Workshop, 2011, pp. 87-94.

Lange et al., "Remote real-time trajectory simplification", IEEE International Conference on Pervasive Computing and Communications, Mar. 9-13, 2009, pp. 1-10.

Lange et al., "Efficient Real-Time trajectory tracking", The International Journal on Very Large Data Bases, vol. 20, No. 5, Oct. 2011, pp. 671-694.

Jakobsen et al., "Evaluating Eco-Driving Advice Using GPS/CANBus Data", Proceedings of the 21st ACM SIGSPATIAL International Conference on Advances in Geographic Information Systems, Nov. 5-8, 2013, pp. 44-53.

International Search Report and Written Opinion received for corresponding Patent Cooperation Treaty Application No. PCT/EP2014/073316, dated Feb. 6, 2015, 12 pages.

* cited by examiner

METHOD FOR COMPRESSING AND RECONSTRUCTING DATA SAMPLED FROM CONTINUOUS FUNCTIONS

BACKGROUND

1. Technical Field

The exemplary and non-limiting embodiments disclosed herein relate generally to real-time compression and decompression of measurements sampled from continuous functions and, more particularly, to the reduction of bandwidth requirements for wireless transmission of data and the reduction of database storage of the data.

2. Brief Description of Prior Developments

Two classes of trajectory data compression include batched compression techniques, intended for processing a whole trajectory all at once, and online data reduction techniques which decide in real time which data points to include and which to exclude.

Batched compression techniques typically represent the original set of data with a smaller, sub-sampled set. The data is (approximately) reconstructed by using linear interpolation between the sub-sampled points.

The key difference between batched compression techniques and real time compression is that the batch methods require the complete data set before compression starts. One example of a batch technique uses Bellman's dynamic programming method, which for a given number of segments can find an optimal piecewise polynomial approximation to the data. The main drawbacks of this approach are (A) its heavy computational effort, (B) the requirement that the number of segments in the piecewise polynomial approximation is known in advance, and (C) the lack of a bound on error for a given number of segments. Another batch technique is the Douglas-Peucker algorithm, which starts with the first and last data points and iteratively adds points to construct a piecewise linear approximation to the data. This algorithm guarantees a bound on the maximum error, but using an unspecified number of segments. The Douglas-Peucker algorithm is computationally more efficient than dynamic programming, but cannot guarantee that the resulting approximation is optimal.

Online data reduction techniques for position data are similar to batch methods in that both approximate the original data with a representative subset. However, due to the lack of future knowledge, online methods need a different algorithm component for determining which points to include in the representative subset. Two main categories of online methods are those based on interpolation of previous measurements and those based on deviation from extrapolation. Interpolation methods exclude as many points as possible as long as the linear interpolation between included points does not deviate too far from the excluded points. Extrapolation methods exclude points as long as they are near enough to a prediction based on previously included measurements (and possibly previously saved speed and heading information).

Except for Bellman's dynamic programming method, which is poorly suited to online compression, the common aspect of batched compression and online data reduction is that both techniques select a subset of the measurements to transmit (or store in the database) and then interpolate linearly between the selected points. Irrespective of the manner in which the points are selected, these techniques are limited in how efficiently a trajectory can be approximated. If a trajectory follows a curved path or has nonlinearities in time (due to acceleration) then inefficiencies may be realized, no matter how the representative points are selected.

SUMMARY

The following summary is merely intended to be exemplary. The summary is not intended to limit the scope of the claims.

In accordance with one aspect, a method comprises obtaining data points, each comprised of a time stamp and measurement; dividing the data points into sequences of consecutive data points; limiting the maximum time between consecutive data points in the same sequence; limiting the maximum time between the earliest and latest data points in each sequence; calculating a polynomial of lowest transmission cost for each sequence; limiting the approximation error between the data points in a sequence and the associated polynomial; and transmitting, to a server, data based on the calculated polynomial.

In accordance with another aspect, an apparatus comprises at least one processor and at least one memory including computer program code, the at least one memory and the computer program code configured to, with the at least one processor, cause the apparatus to: obtain data points, each comprised of a time stamp and measurement; divide the data points into sequences of consecutive data points; limit the maximum time between consecutive data points in the same sequence; limit the maximum time between the earliest and latest data points in each sequence; calculate a polynomial of lowest transmission cost for each sequence; limit the approximation error between the data points in a sequence and the associated polynomial; and transmit, to a server, data based on the calculated polynomial.

BRIEF DESCRIPTION OF THE DRAWINGS

The foregoing aspects and other features are explained in the following description, taken in connection with the accompanying drawings, wherein.

DETAILED DESCRIPTION OF EMBODIMENT

Figure 1:
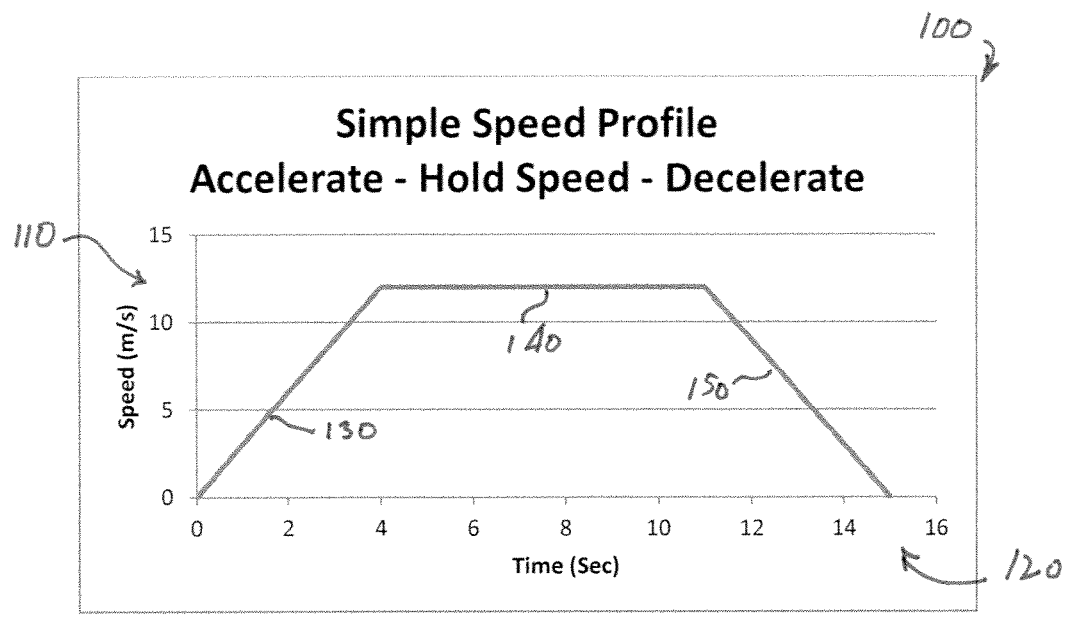
FIG. 1 is a graphical representation of a simple speed profile of a vehicle.

During the operation of a vehicle, GPS (global positioning satellite) trajectories as well as the vehicle's Control Area Network (CAN) bus signals (e.g. braking, speed, turn indicators, windshield wipers, engine speed, etc.) can be collected. While information pertaining to both the GPS trajectories and the CAN bus signals are transferred to a remote server and processed to infer useful information (e.g., stay points, traffic congestion, and the like), the data volume of the signal transfer is high and the transmission bandwidth is limited. Although the exemplary embodiments disclosed herein refer to a vehicle and CAN bus signals, the concepts are applicable to any sampling from a continuous function from a mobile device (e.g., phones, tablets, computers, handheld navigation units, and the like).

The exemplary embodiments disclosed herein result from investigations of methods of processing that can be performed on a vehicle in an effort to reduce the amount of bandwidth used for transmission of signals to the server. Dynamic sampling rates and methods for reconstructing original signals are considered. Sub-sampling and interpolation of the reconstructed signals yield adequate accuracy when the vehicle speed and direction are nearly constant. A processor on the vehicle may dynamically determine the sampling rate needed to describe the vehicle position (GPS latitude and longitude) as a function of time. Similar dynamic sampling can be applied to scalar CAN bus signals such as, for example, speed.

Processing of the sampled signals can be seen as a synthesis of piecewise linear approximation techniques and deviation from extrapolation (DE) techniques. By including higher order models of DE techniques, improvements in approximating data that is non-linear in time or space (such as vehicle position, engine speed, and the like) can be realized. By incorporating the interpolation framework of piecewise linear approximation techniques, both instability associated with extrapolation and higher data requirements of the DE techniques can be avoided.

There are two potential benefits of dynamic sampling rates, namely, data reduction and transmission count reduction. Data reduction involves reducing the number of measurements, which results in the consumption of less communication bandwidth and less database storage. Reducing bandwidth and database storage can be effected by reducing the number of measurements taken. For example, many position measurements taken by a GPS system are redundant. In particular, when a vehicle waits at a traffic signal, data indicative of the same position can be repeated and transmitted to the server once per second for 20-30 seconds, thereby unnecessarily consuming bandwidth. Similarly, on a straight highway at substantially constant speed, the same speed data is repeatedly transmitted to the server. In either case, a simple linear interpolation of the end points generally operates as an adequate approximation to a multitude of different measurements.

With regard to transmission count reduction, each transmission has an associated overhead in the form of a header defined by data bytes. Internet protocol (IP) and transport layer headers generally comprise sizable amounts of bytes depending on the protocols. For each time and speed measurement transmitted, the size of the overhead can exceed the size of the data. Increasing the number of measurements per transmission reduces the total overhead and reduces the ratio of overhead to data transmitted.

Although various features will be described with reference to the example embodiments shown in the Figures described below, it should be understood that features can be embodied in many alternate forms. In addition, any suitable size, shape, or type of elements or materials could be used.

Referring now to FIG. 1, a graphical representation of a speed profile for a vehicle travelling on a segment of straight road between two stop points is designated generally by the reference number 100 and is hereinafter referred to as "speed profile 100." The speed profile 100 comprises a speed function 110 plotted against time 120. The speed function 110 is defined over three zones through which the vehicle travels, the zones being shown as an acceleration zone 130, a constant speed zone 140, and a deceleration zone 150. Since the road is straight, a position of a vehicle travelling on the road can be considered equivalent to a distance travelled along the road.

Figure 2:
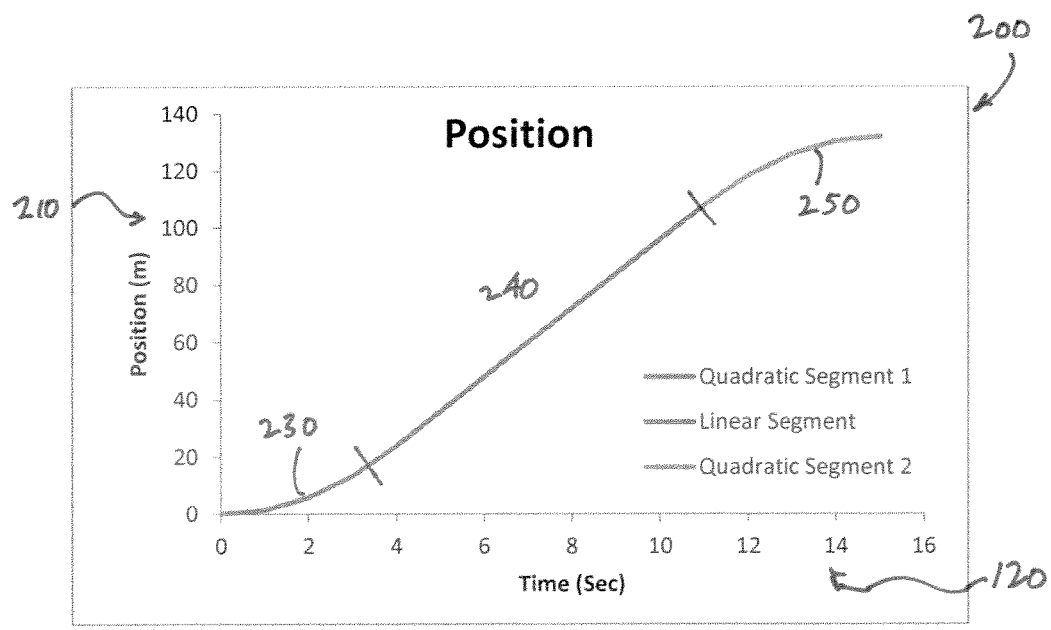
FIG. 2 is a graphical representation of a position function of the vehicle.

Referring now to FIG. 2, a graphical representation of a position profile of the vehicle is designated generally by the reference number 200 and is hereinafter referred to as "position profile 200." In the position profile 200, the speed function 110 is integrated to give a position function 210 (against time 120). The position profile 200 is defined by a first quadratic segment 230, a linear segment 240, and a second quadratic segment 250.

Figure 3:
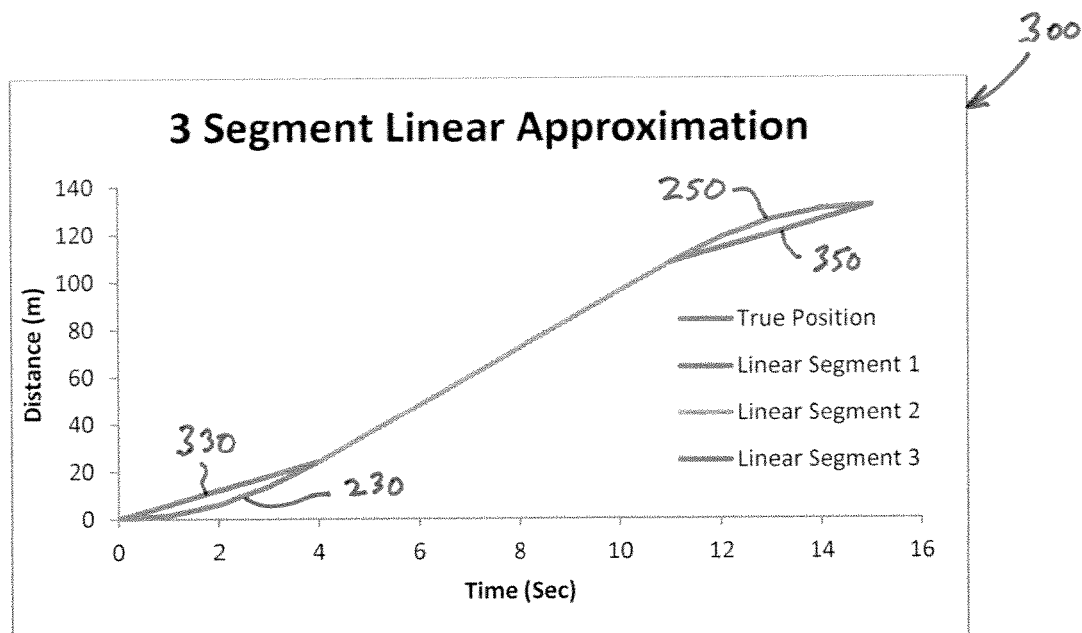
FIG. 3 is a graphical representation of a piecewise linear approximation of the position function of FIG. 2.

Referring now to FIG. 3, a graphical representation of a piecewise linear approximation of the position function 210 (from FIG. 2) is designated generally by the reference number 300 and is hereinafter referred to as "linear approximation 300." Linear approximation 300 is a piecewise constant velocity model that defines the first quadratic segment 230 as a "true" position of the vehicle and imposes a first linear segment 330 on the first quadratic segment 230. Linear approximation 300 further defines the second quadratic segment 250 as a "true" position of the vehicle and imposes a second linear segment 350 on the second quadratic segment 250. Since it is assumed that the road is straight, error defined by the difference between the first linear segment 330 and the first quadratic segment 230 (and error defined by the difference between the second linear segment 350 and the second quadratic segment 250) is not due to road geometry, but is instead completely the result of the inconsistency between the assumption of constant velocity and the actual variable velocity.

Figure 4:
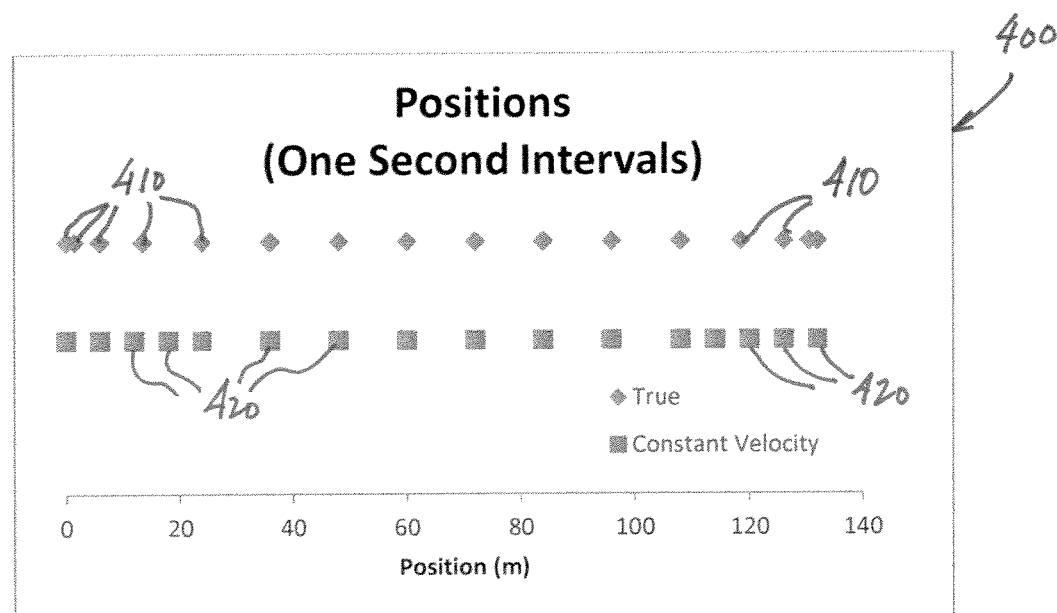
FIG. 4 is a graphical representation of the differences between true position and a piecewise constant velocity model as shown in FIG. 3.

Referring now to FIG. 4, a graphical representation of the difference between the "true" positions of the vehicle and the piecewise constant velocity model of the linear approximation 300 is designated generally by the reference number 400. In plotting data points 410 indicating the true positions of the vehicle relative to data points 420 indicating the constant velocity positions based on the linear approximation, it can be seen that discrepancies occur at the extremes of the two sets of data points indicating vehicle position. In particular, the first and last four data points 410 indicating true positions of the vehicle do not correspond to the first and last four data points 420 indicating the constant velocity positions based on the linear approximation. This is because the first linear segment 330 and the second linear segment 350 each assume constant velocity. However, within the first linear segment 330 and the second linear segment 350, the actual velocity is varying, and the position error is as high as about 6 meters. In systems in which the exemplary embodiments described herein are used to plot traffic congestion, position error of 6 meters may not be significant. However, in scenarios in which braking points are to be determined, distances of 6 meters may have an effect on other vehicles travelling the same road as the vehicle in which measurements are taken. Furthermore, algorithms using "time synchronized Euclidean distance" that employs non-uniform sampling intervals while still assuming constant velocity will not compensate for the lack of correspondence between data points 410 indicating true positions of the vehicle and data points 420 indicating the constant velocity positions based on the linear approximation.

In the exemplary embodiments described herein, an approximating polynomial of degree up to two is used to fit the true position of the vehicle. In doing so, an assumption of linearity (position or speed) is relaxed by creating a piecewise polynomial approximation. Of course, the invention is not limited to data that is not piecewise linear. Lines are polynomials of degree one, so the set of piecewise linear functions (used by the prior art) is a subset of the set of piecewise polynomial functions (used by the invention). Any approximation that is possible with the prior art is still possible with this invention. But the invention has the option of improving the approximating function by drawing from a larger set of options.

In creating a piecewise polynomial approximation, two features improve the usability of the approximation. The first feature is the addition of a constraint on the maximum age of data used for a local approximation. This feature facilitates maintaining the data fresh for time sensitive real-time tracking applications. For example, in a ten minute interval period in which a vehicle moves in a straight line at a constant speed, considering only approximation error and data compression, a single linear approximation would be transmitted. But waiting until the end of the ten minutes to provide transmission would result in a real-time tracking application having data that is 10 minutes old. To address this, constraining the maximum age of the data used for a local approximation to a relatively shorter time (e.g., 15 seconds) limits the time lag between data measurement and transmission. If local approximations are transmitted at intervals of no more than 15 seconds, then the tracking application would have data that is no more than 15 seconds out of date.

The second feature to improve the usability of the approximation involves adding a constraint on the maximum time between consecutive raw measurements spanned by a single local polynomial approximation. When using a continuous function to approximate discrete measurements, the function is used to interpolate values at times between the measurement times. As the interval between measurements gets larger, the interpolation becomes prone to error. For example, consider typical GPS measurements made at one second intervals. GPS receivers are prone to loss of signal from the GPS satellites (due to interference from buildings, trees, and terrain). In a vehicle moving at 50 kilometers per hour (km/h) (about 31 miles per hour (mph)), four seconds of signal loss can correspond to a distance of 55 meters. Over that time and distance, a vehicle may change lanes, turn a corner, or take a curved freeway onramp. Simple interpolations in these cases can lead to significant errors. In the exemplary embodiment, the loss of signal is indicated by local approximations that do not include the suspect time interval. For example, consider the case of GPS measurements with timestamps (in seconds) of 1, 2, 3, 4, 5, 9, 10, 12, and 13. If the maximum allowed time between measurements is set to 3 seconds, then the interval from 5 to 9 would be considered too long to include in a local approximation. In such instances, there might be two local approximations: one covering the timestamps between 1 and 5, and the second covering the timestamps from 9 to 13. The times between 5 and 9 would not be included in any local approximation. This would indicate to a user that there were no measurements between timestamps 5 and 9. Limiting the maximum time between consecutive raw measurements makes interpolation more reliable.

Figure 5:
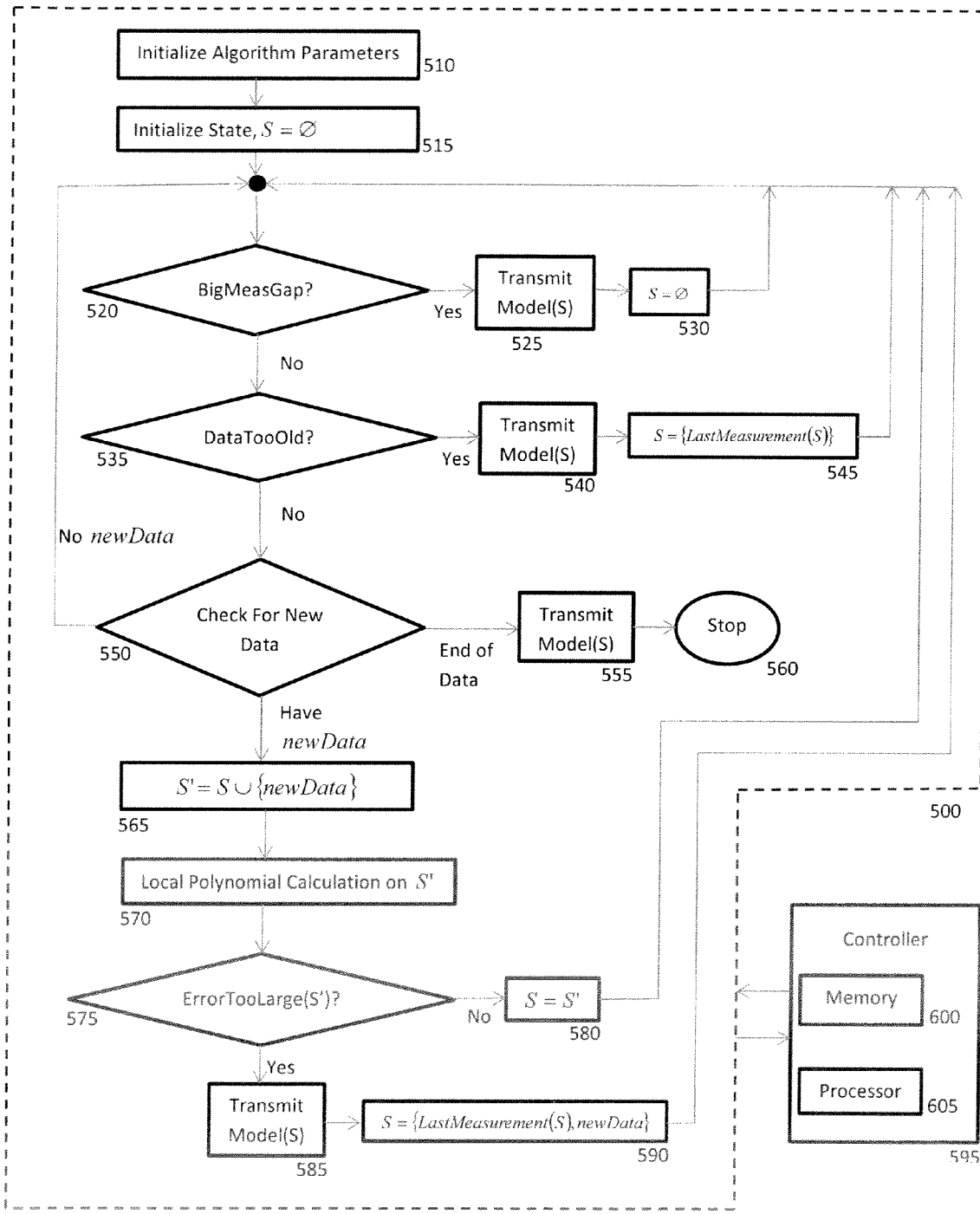
FIG. 5 is a flow of an algorithm used in determining an active set of data points for a piecewise polynomial approximation.

Referring now to FIG. 5, one exemplary embodiment of an algorithm for obtaining data points from a continuous function for use in implementing a piecewise polynomial approximation is designated generally by the reference number 500 and is hereinafter referred to as "algorithm 500." This exemplary embodiment is described in terms of scalar (1-dimensional) data. For vector data (like 3-dimensional GPS measurements), the embodiment can be applied to each dimension separately. Algorithm 500 operates using a controller 595 having a memory 600 and a processor 605.

In the algorithm 500, algorithm parameters are defined in a definition step 510. In the definition step 510:

> m = max time gap allowed between consecutive raw measurements spanned by a single local approximation
> M = max age (in seconds) of data in active set (this limits the time lag between data measurement and transmission)
> ErrorTol = Maximum allowed approximation error
> D = maximum allowed degree of polynomial After the parameters are initialized, control passes to the state initialization step 515.

Following the parameter initialization step 510, a state initialization step 515 is carried out in which the set of active data points is initialized to "empty." Control passes to measurement gap test step 520.

Following the state initialization step 515, the gap between measurements is tested in step 520. In the measurement gap test step 520, a determination is made regarding whether the time since the last data point, namely, ($T_{max}(S)$), is greater than the maximum time (m) allowed between consecutive measurements spanned by a single polynomial. If S is non-empty and the equation:

$$\text{CurrentTime} - T_{max}(S) > m \qquad \text{(Eq. 1)}$$

is satisfied, then control passes to the transmission step 525. Otherwise, control passes to data age test step 535. When S is empty, control passes to data age test step 535.

In the transmission step 525, the parameters of the polynomial approximation are transmitted. After transmission, control passes to active set updating step 530.

In active step updating step 530, the active set is set to empty, and control passes to measurement gap test step 520.

In data age test step 535, a determination is made regarding whether the time since the earliest data point in S ($T_{max}(S)$) is greater than the maximum age (M) allowed for data in a local approximation. If S is non-empty and the equation:

$$\text{CurrentTime} - T_{min}(S) > M \qquad \text{(Eq. 2)}$$

is satisfied, then control passes to the transmission step 540. Otherwise, control passes to new data check step 550. If S is empty, then control passes to new data check step 550.

In the transmission step 540, the parameters of the polynomial approximation are transmitted. After transmission, control passes to active set updating step 545.

In active set updating step 545, the active set is set to contain only the most recent data point in S that satisfies:

$$\text{CurrentTime} - \text{dataPointTime} \leq M \qquad \text{(Eq. 3)}$$

If no such data point exists (the age of every data point in S is greater than M) then S is set to empty. Control passes to the measurement gap test step 520.

In the new data step 550, a check is made for new data. If the end of the data has been reached, control passes to transmission step 555. Otherwise, if there is no new data, control passes to measurement gap test step 520. Otherwise, there is new data and control passes to candidate active set step 565.

In the transmission step 555, the parameters of the polynomial approximation are transmitted. After transmission, control passes to shutdown step 560.

In shutdown step 560, the process is stopped.

In step 565, the candidate active set, S', is set to the union of the active set, S, and the new data. Control passes to the polynomial calculation step 570.

In the polynomial calculation step 570, polynomials of degree up to max(SizeOf(S')−1, D) (where D is the algorithm parameter defined in step 510) are fit to the points in S'. For each polynomial, the independent variable is time and the approximation error is measured between the data points in S' and the polynomial evaluated at the times associated with the data points. Model (S') is set to the most efficient polynomial (the polynomial which requires the smallest number of bytes in transmission) which has approximation error less than ErrorTol (algorithm parameter defined in step 510). If no such polynomial exists (all approximation errors are too big), then control passes to transmission step 585. Otherwise, control passes to active set update step 580.

In active set update step 580, the active set S is set to the candidate active set S'. Control passes to measurement gap test step 520.

In the transmission step 585, the parameters of the polynomial approximation are transmitted. After transmission, control passes to shutdown step active set update step 590.

In active set updating step 590, the active set is set to contain only the most recent data point in S that satisfies equation 3. If no such data point exists (the age of every data point in S is greater than M) then S is set to empty. Then the newest data point is added to the active set.

Control passes to the measurement gap test step 520.

The algorithm 500 continues to cycle until no new data exists. The algorithm 500 then terminates in the termination step 560.

In the polynomial calculation step 570 polynomials are fit to data points in S'. One exemplary method would require that the local polynomial approximation passes through the first and last points in S'. This approach promotes continuity in the piecewise polynomial approximation since (except for when there are large time gaps between measurements) the next local polynomial approximation will begin where the previous one ended. Another exemplary method would find the polynomial which minimizes the error (e.g., mean squared error, max absolute error, etc.) and not require that the resulting polynomial pass through the first and last points in S'. This approach would tend to reduce the approximation error at the expense of losing continuity in the piecewise polynomial approximation.

Referring again to the polynomial calculation step 570, one exemplary method would fit a polynomial of degree d (d>=1) to a set of n (n>=d+1) data points by making the polynomial pass through d+1 data points in S'. This method would simplify the computation since the calculation of the polynomial coefficients would be equivalent to solving one square system of equations for each set of d+1 points. Another exemplary method would use the "least squares" polynomial fit to all the data points in S'. The "least squares" polynomial minimizes the sum of squared errors between the polynomial and the data points. Yet another exemplary method would solve a constrained least squares optimization which minimizes the sum of squared errors while meeting some constraints on the approximating functions. Such constraints might be motivated by knowledge about the physical meaning of the measurement and the process generating the measurements (e.g., maximum accelerations and engine speed (RPM) in road cars). The selection of the objective to be optimized and the constraints to be satisfied would depend on the particular application.

To use the set of active data points (S) in the piecewise polynomial approximation, time stamps are used. GPS time stamps are the number of microseconds since Jan. 1, 1970. For times in the year 2013, these time stamps require 14 digits. Since unsigned 32 bit integers can only code 10 digits, 64 bit integers are used. For local polynomial approximations, a 32 bit integer can represent the microseconds in about 35 minutes. This is sufficient for the 10-60 seconds used for maximum time between transmissions.

Implementation of the active data points (S) in an exemplary piecewise polynomial approximation further utilizes coordinate transformations in order to work with GPS positions. GPS positions are usually stored in geodetic coordinates (latitude, longitude, elevation). In order to calculate Euclidean distances for error metrics, the geodetic coordinates are converted into a rectangular coordinate system. Many regions of the world have their own local rectangular coordinate systems (e.g., State Plane Coordinates are used in the USA). The disadvantage of using these coordinate systems is that the implementing code is customized for each region. Universal Trans Mercator (UTM, northing-easting-elevation) coordinates use a simpler system that can be applied globally. However, UTM is based on dividing the world into zones of longitude and has discontinuities at zone boundaries. Another disadvantage of UTM coordinates is that zone information is carried along with the coordinates in order to reconstruct the geodetic coordinates.

The exemplary embodiments of the algorithms described herein use the Local Tangent Plane (LTP) system, which adopts the east-north-up (ENU) convention and which is based on offsets relative to a user-defined local reference point. The reference point, in geodetic coordinates, is transmitted only once at the start of a drive. This approach eliminates discontinuities within a single drive. Although drives in LTP coordinates with different reference points cannot be compared directly, conversion to geodetic coordinates and back to LTP using a different reference point is straightforward. For most local rectangular coordinate systems, positions from a typical car drive can be coded more compactly (32 bit floating point numbers rather than 64 bit doubles) as compared to the raw geodetic coordinates.

Creating a linear model between two data points $(t_0, x_0)$ and $(t_1, x_1)$ for times $t_0, t_1 \in \Re$ and measurements $x_0, x_1 \in \Re$ can be handled as a special case using the following equation:

$$f(t) = x_0 + \left(\frac{t - t_0}{t_1 - t_0}\right)(x_1 - x_0) \tag{Eq. 4}$$

A polynomial model of degree d has the form:

$$f(t) = c_0 + c_1(t - t_0) + \cdots + c_d(t - t_0)^d \tag{Eq. 5}$$

$$= \sum_{i=0}^{d} c_i(t - t_0)^i$$

In one embodiment corresponding to Eq. 5 (which describes one exemplary embodiment of reconstruction of original measurements from polynomials (server side processing)), the data transmitted for the measurements $(t_0, x_0) \ldots (t_n, x_n)$ includes:
  d=degree of polynomial
  $c_i$=coefficient of polynomial, $\forall i=0, \ldots, d$
  $t_0$=time stamp of first measurement
  $\Delta_j = t_j - t_0 \; \forall j=1, \ldots, n$
The transmitted data can be processed by the server in two ways: immediate or delayed decompression. For immediate decompression, the reconstructed data (time and measurement) are calculated using the following formula:

$$(t_0, c_0), \left(t_0 + \Delta_1, \sum_{i=0}^{d} c_i \Delta_1^i\right), \cdots, \left(t_0 + \Delta_n, \sum_{i=0}^{d} c_i \Delta_n^i\right) \quad \text{(Eq. 6)}$$

For delayed decompression, the compressed data can be stored in a database as transmitted. This reduces storage requirements compared to storing the uncompressed data. The data can be reconstructed as desired using the same calculations described above for immediate decompression.

In addition to reducing the data storage requirements, the storage of the transmitted data also provides estimates of the signal in times between the sampled data. For example for any time, $\hat{t} \in (t_0, t_n)$, the interpolated data is:

$$\left(\hat{t}, \sum_{i=0}^{d} c_i (\hat{t} - t_0)^i\right) \quad \text{(Eq. 7)}$$

In another embodiment, the transmitted data does not include the time $\Delta$s. This embodiment could be used when it is desired to have an estimate of the measurement at any time, but the particular sampled points are not needed. In this case, the transmitted data is stored in a database and interpolated data points are generated as desired using the interpolation formula above. The requirements for data transmission and storage are greatly reduced by omitting the time $\Delta$s. One example application of this embodiment is mapping of GPS position to CAN bus speed. The GPS position interpolation function can be evaluated using the time of a speed measurement to estimate the vehicle position when the speed measurement was made. In this case the sampled GPS points are not used directly.

To fit higher order polynomial models for data points $(t_i, x_i)$ with times $t_0 < t_1 < \ldots < t_{n-1} \in \mathfrak{R}$ and scalar measurements $x_0, x_1, \ldots, x_{n-1} \in \mathfrak{R}$, the general method for least squares fitting of a polynomial of degree d ($d \leq n-1$) is described:

$$A \equiv \begin{bmatrix} 1 & 0 & \cdots & 0 \\ 1 & t_1 - t_0 & \cdots & (t_1 - t_0)^d \\ \vdots & & \ddots & \vdots \\ 1 & t_{n-1} - t_0 & \cdots & (t_{n-1} - t_0)^d \end{bmatrix} \in \mathfrak{R}^{n \times (d+1)} \quad \text{(Eq. 8)}$$

$$C \equiv \text{coefficients} \equiv \begin{bmatrix} c_0 \\ c_1 \\ \vdots \\ c_d \end{bmatrix}$$

$$X \equiv \begin{bmatrix} x_0 \\ x_1 \\ \vdots \\ x_{n-1} \end{bmatrix}$$

It is desirable to solve for coefficients that satisfy $AC=X$, but finding such a solution is not generally possible. The coefficients, $C^*$, which minimize the sum of squared errors between $AC$ and $X$ are given by:

$$C^* = (A^T A)^{-1} A^T X \quad \text{(Eq. 9)}$$

where $(A^T A)^{-1} A^T$ is the pseudo-inverse of A. Closed forms for the inverse of a 3×3 matrix (used for quadratic functions) are available, so a third party linear algebra library is not required for the exemplary embodiments disclosed herein. To fit GPS positions, latitude-longitude-elevation is first converted to LTP coordinates (east-north-up), then a separate polynomial is fitted to each dimension. Also, while time stamps are in microseconds, polynomials are fitted in seconds to mitigate numerical instability in the exponentiated times in matrix A. A further improvement to numerical stability can be achieved by normalizing times to be between zero and 1 for each local approximation.

Although the polynomials are fitted using a least squares error objective applied to each coordinate separately, the final model may be evaluated using any metric, including Euclidean length of error in 3-D. The error could also be decomposed into the component parallel to the average direction of travel (along the road) and the component perpendicular to the average direction of travel (across the road). Doing so may facilitate estimating the error in estimating road geometry.

Fitting a polynomial of degree d requires at least d+1 points. To insure continuity of the polynomial model of the disclosed exemplary embodiments, the first and last data points in the active set of data points are used. For quadratic models, all possible choices of the third point from the active set are tried, and the polynomial model with best error is used. Another approach involves the use of a least squares fit that passes through the first and last points but that does not need to go through any of the other points. In some embodiments, relaxing the constraints may tend to reduce the approximation errors.

To understand the potential performance of the exemplary embodiments of the polynomial model, a comparison is made of the limiting behavior of the polynomial model to that of three reference benchmarks, namely, naïve encoding and simple reference with offset compression and piecewise linear approximation. For generality of application and clarity of presentation, discussion is limited to standard 32 and 64 bit integers and 32 bit float and 64 bit double precision representations. Using application specific knowledge (e.g., expected ranges of signal values, maximum rates of change in signal values, sampling rates, error tolerances) and custom binary coding of data, further compression could be achieved.

Naïve encoding describes each signal (e.g., time stamps, GPS position, CAN bus speed) with raw measurements from the sensors. As stated above, GPS time is represented in microseconds since Jan. 1, 1970, and the coding of times in 2013 requires 14 digits. However, bit integers provide only about 10 digits of precision, so the exemplary embodiments disclosed herein utilize raw GPS time stamps of 64 bit integers.

With regard to GPS positions, 32 bit floating point numbers have about 7 digits of precision. When applied to geodetic coordinates (latitude, longitude, altitude), three digits are used for whole angles, leaving 4 digits of fractional angle precision. This is suitable for precision to only about 10 meters. In the exemplary embodiments described herein, it is assumed that raw GPS positions use 64 bit double precision representation.

For the scalar CAN bus measurements, it is assumed that continuous CAN bus measurements such as engine speed, fuel consumption, and the like can be represented directly with single precision 32 bit floating point numbers, the smallest standard floating point representation. With custom, signal-specific scaling, adequate precision could likely be achieved with 16 bit or even 8 bit unsigned integers. However, 32-bit floating point numbers are used in order to allow a more generic algorithm implementation.

With regard to vehicle identification, each transmission includes pertinent data identifying the particular vehicle. To do so, 16 bit and 32 bit integers are used to code 65,536 and 4,294,967,296 values, respectively. In the exemplary embodiments described herein, 32 bit vehicle IDs are used.

In considering the second benchmark (simple reference with offset compression), instead of transmitting 64 bit doubles for each longitude, a single bit double could be transmitted for the initial longitude, followed by the transmission of 32 bit floating point numbers to describe the subsequent offsets from the initial value. The original measurements could then be reconstructed to high precision by adding the initial value to each of the later offsets. Simply by using low precision offsets from high precision reference values, doubles and 64 bit integers can be replaced with floating point numbers and 32 bit integers. It is therefore possible to achieve almost 50% reduction in data size with no loss of precision compared to the naïve encoding described above. Also, significant reduction in transmission overhead can be achieved with the buffering and sending of batches of measurements.

Furthermore, LTP coordinates are one implementation of the simple reference with offset compression, with the advantage that the offsets have useful interpretation. Distance calculations (errors, distances between trajectories, distance traveled in a given time interval, and the like) can be handled directly. The disadvantage of LTP coordinates is that a conversion may be required to get reconstructed positions back to geodetic coordinates.

In considering the third benchmark (piecewise linear approximation), in order to isolate the effect of quadratic approximations vs. linear approximations, piecewise linear approximations are assumed to be obtained by using the same maximum error, maximum time between transmissions, and maximum time between measurement constraints.

Since the proposed method incorporates LTP coordinates, a form of reference with offset compression (which should be able to achieve nearly 50% data reduction), the method should be capable of data reduction of at least 50%.

Another target is to characterize the cases in which the proposed method has better data reduction than a piecewise linear approximation using the same constraints. Since the proposed method is more complex and has more overhead per local approximation, it is desirable to know when the extra effort is justified in real world scenarios.

Theoretical limits exist with regard to using the piecewise approximation models. When using piecewise linear or piecewise quadratic approximations, the natural unit of transmission is a single local polynomial approximation. Examples of such limits for determining GPS position and scalar measurement are illustrated in the following examples.

Example 1—Determining GPS Position

The variable N was assigned the number of measurements summarized in a single local approximation. Each raw GPS measurement then required:
 4 bytes for vehicle ID
 8 bytes for time
 8 bytes per dimension (latitude, longitude, elevation)
 36 bytes per measurement
 Total=36N bytes The local linear approximation had:
 4 bytes for vehicle ID
 8 bytes for initial time
 (N−1)×4 bytes for subsequent times
 12 bytes for initial position=3 dimensions×4 bytes per dimension
 Total=(4+8+12)+(N−1)×4=20+4N bytes
The local quadratic coefficients had:
 4 bytes for vehicle ID
 8 bytes for initial time
 (N−1)×4 bytes for subsequent times 36=3 dimensions×3 coefficients per dimension×4 bytes per coefficients of quadratic approximation to LTP coordinates (east, north, up)
 Total=(4+8+36)+(N−1)×4=44+4N bytes
The GPS data reduction rates for both the linear and quadratic equations were determined to be:

$$GpsDataReductionRate_{Linear} = 1 - \frac{20+4N}{36N} \quad \text{(Eq. 10)}$$

$$GpsDataReductionRate_{Quadratic} = 1 - \frac{44+4N}{36N}$$

It was then determined that as N became larger (higher sampling rate or longer times between transmissions), both GPS data reduction rates converged to $$\frac{8}{9} \ (88.9\%).$$

Example 2—Scalar Measurement (e.g., Speed)

The variable N was assigned the number of measurements summarized in a local approximation. Each raw scalar CAN bus measurement (e.g., speed) then required:
 4 bytes for vehicle ID
 8 bytes for time
 4 bytes per dimension
 16 bytes per measurement
 Total=16N bytes
The local linear approximation had
 4 bytes for vehicle ID
 8 bytes for initial time
 (N−1)×4 bytes for subsequent times
 4 bytes for initial measurement
 Total=(4+8+4)+(N−1)×4=12+4N bytes
The local quadratic coefficients had
 4 bytes for vehicle ID
 8 bytes for initial time
 (N−1)×4 bytes for subsequent times
 12 bytes=1 polynomial×3 coefficients per dimension×4 bytes per coefficient coefficients of quadratic approximation to LTP coordinates (east, north, up)
 Total=(4+8+12)+(N−1)×4=20+4N bytes
The scalar data reduction rates for both the linear and quadratic equations were determined to be:

$$ScalarDataReductionRate_{Linear} = 1 - \frac{12+4N}{16N} \quad \text{(Eq. 11)}$$

$$ScalarDataReductionRate_{Quadratic} = 1 - \frac{20+4N}{16N}$$

It was then determined that as N became larger (higher sampling rate or longer times between transmissions), both scalar data reduction rates converged to $$\frac{12}{16} \, (75\%),$$

and the piecewise linear approximation was always more efficient for the same N.

Based on the foregoing Examples, it was observed that for the same N, (A) the linear models and quadratic models have similar limiting data reduction rates as N gets large and (B) the linear models are more efficient than the quadratic model. The sampling rates, maximum time allowed between transmissions, and maximum allowed approximation error are likely determined by the data and application characteristics. Therefore, the main driver of data reduction rates is the number of points that can be approximated with a single local approximation (linear or quadratic) without violating the maximum allowed approximation error. Data which is very close to piecewise linear should give similar N for both linear and quadratic approximations. In this case, the piecewise linear approximation will be more efficient. Data which is more nonlinear may give higher N for quadratic approximations. In this case, the piecewise quadratic model may be more efficient. The proposed method dynamically selects the most efficient functional form based on the data, whose characteristics may change over time even though the data is from a single source.

Furthermore, it is possible that in some cases the larger N of quadratic approximations is balanced by the larger overhead and that the data compression rates are similar for linear and quadratic approximations. In this case, if the approximations are used for offline database compression, then the approximations may be equal.

However, if the approximations are being used for transmission bandwidth reduction in real time, then the quadratic approximation might be preferred. The calculations above included minimal overhead like vehicle ID. If other overhead (like IP and transport layer headers) is considered, the overhead can range from tens of bytes to over 1000 bytes, depending on the protocol. In this case, reducing the number of transmissions may be just as desirable as reducing the data being transmitted. If the data reduction rates are similar, then the quadratic approximation has a larger average N, and this can be assumed to be using fewer transmissions.

The calculations in Examples 1 and 2 above assumed that it was desirable to be able to reconstruct (with controllable error) the original measurements. If it is sufficient to have approximate trajectory and speed as functions of time and no sense of what measurements produced the approximation, then the data requirements can be reduced considerably. In particular, the times of the measurements can be omitted and the data reduction rates could approach 100% as N becomes larger.

The advantages of the exemplary embodiments described herein are numerous. For example, the methods and techniques recited above can describe more measurements with a single function than existing piecewise linear models. This translates into less space in a database and less total data stored. Also, if local approximations are transmitted as they are generated (in order to keep the data on a server fresh), then fewer transmissions will be required and bandwidth lost to transmission overhead (e.g., communication protocol headers) will be reduced. Furthermore, for high precision applications (e.g., finding lane level geometry), the techniques and methods described herein outperform existing piecewise linear approximation methods because error from the assumption of linearity is more noticeable. Moreover, interpolation is more stable than extrapolation. Additionally, compared to deviation from prediction approaches, extrapolation is not required to be performed on the server. Freshness of data can be ensured by limiting the time lag between data measurement and transmission.

A method comprises obtaining data points, each comprised of a time stamp and measurement; dividing the data points into sequences of consecutive data points; limiting the maximum time between consecutive data points in the same sequence; limiting the maximum time between the earliest and latest data points in each sequence; calculating a polynomial of lowest transmission cost for each sequence; limiting the approximation error between the data points in a sequence and the associated polynomial; and transmitting, to a server, data based on the calculated polynomial. Calculating a polynomial of lowest transmission cost may comprise applying a least squares error objective. Calculating a polynomial of lowest transmission cost may comprise constraining the polynomial to pass through one or more of the data points in the sequence. The data points may use geodetic coordinates. The geodetic coordinates may be converted to a rectangular coordinate system before fitting the polynomials. At least one of the data points may comprise a control area network bus signal. High resolution reference points for sources of the data points may be transmitted either only at the start of data collection or infrequently and polynomials may describe offsets from the corresponding reference point.

An apparatus comprises at least one processor and at least one memory including computer program code, the at least one memory and the computer program code configured to, with the at least one processor, cause the apparatus to: obtain data points, each comprised of a time stamp and measurement; divide the data points into sequences of consecutive data points; limit the maximum time between consecutive data points in the same sequence; limit the maximum time between the earliest and latest data points in each sequence; calculate a polynomial of lowest transmission cost for each sequence; limit the approximation error between the data points in a sequence and the associated polynomial; and transmit, to a server, data based on the calculated polynomial. When calculating a polynomial of lowest transmission cost, the apparatus may apply a least squares error objective. When calculating a polynomial of lowest transmission cost, the apparatus may apply a constraint that the polynomial passes through one or more of the data points in the sequence. The apparatus may obtain data points in geodetic coordinates and fit the polynomials to the geodetic coordinates without transformation. The apparatus may obtain data points in geodetic coordinates, and the apparatus may convert the geodetic coordinates to rectangular coordinates before fitting the polynomials. High resolution reference points for each data source may be transmitted either only at the start of data collection or infrequently and polynomials describe offsets from the corresponding reference point.

A non-transitory computer readable storage medium comprises one or more sequences of one or more instructions which, when executed by one or more processors of an apparatus, cause the apparatus to at least: approximate the data points using a piecewise polynomial means, the choice of data points to be approximated by each polynomial being constrained by a preselected maximum on the time between consecutive data points approximated by the same polynomial; and transmit data from the approximated polynomial to a remote server. The time between obtaining a data point and the transmission of the data from the corresponding polynomial approximation to the remote server is constrained by a preselected maximum.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications, and variances which fall within the scope of the appended claims.

What is claimed is:

1. A method, comprising:
   receiving at a memory of a device data comprising data points, the data points each representing a global positioning system location of the device and a time stamp at which the location was obtained;
   accessing the data from a processor of the device to obtain the data points;
   dividing, by the processor, the data points into sequences of three or more consecutive data points;
   measuring, by the processor, a time between consecutive data points in a sequence;
   in response to the time between consecutive data points exceeding a maximum time between consecutive data points in the same sequence, providing for transmission of parameters of a polynomial approximation of the data points in the sequence from the device to a server to mitigate approximation errors;
   in response to the time between consecutive data points being below a maximum time between consecutive data points in the same sequence, measuring, by the processor, a time since an earliest data point in the sequence;
   in response to the time since an earliest data point in the sequence exceeding a maximum age, providing for transmission of parameters of a polynomial approximation of the data points in the sequence from the device to a server to mitigate approximation errors;
   in response to the time since an earliest data point in the sequence being below a maximum age, calculating, by the processor, a polynomial of lowest transmission cost for the sequence, the calculated polynomial being based on a candidate active set of data points that is set to a union of an active set of data points and new data points;
   limiting an approximation error between the data points in a sequence and the calculated polynomial; and
   transmitting, to the server, the calculated polynomial as compressed data, wherein the transmitted data is compressed relative to the data points received, and wherein a number of and frequency of transmissions is reduced relative to conventional GPS location reporting, thereby reducing bandwidth consumed by the data transmission and reducing database storage necessary to store the transmitted data.

2. The method of claim 1, wherein calculating a polynomial of lowest transmission cost comprises applying a least squares error objective.

3. The method of claim 1, wherein calculating a polynomial of lowest transmission cost comprises constraining the polynomial to pass through one or more of the data points in the sequence.

4. The method of claim 1, wherein the data points use geodetic coordinates.

5. The method of claim 4, wherein the geodetic coordinates are converted to a rectangular coordinate system before fitting the polynomials.

6. The method of claim 1, wherein a measurement in the data points comprises a control area network bus signal.

7. The method of claim 1, wherein high resolution reference points for sources of the data points are transmitted either only at the start of data collection or so as to include non-repeating data points and polynomials describe offsets from the corresponding reference point.

8. An apparatus, comprising:
   at least one processor, and at least one memory including computer program code, the at least one memory and the computer program code configured to, with the at least one processor, cause the apparatus to:
   receive at the memory data comprising data points, the data points each representing a global positioning system location of a device and a time stamp at which the location of the device was obtained;
   access the data from the memory to obtain the data points;
   divide the data points into sequences of three or more consecutive data points;
   measure a time between consecutive data points in a sequence;
   in response to the time between consecutive data points exceeding a maximum time between consecutive data points in the same sequence, provide for transmission of parameters of a polynomial approximation of the data points in the sequence to a server to mitigate approximation errors;
   in response to the time between consecutive data points being below a maximum time between consecutive data points in the same sequence, measure a time since an earliest data point in the sequence;
   in response to the time since an earliest data point in the sequence exceeding a maximum age, provide for transmission of parameters of a polynomial approximation of the data points in the sequence to the server to mitigate approximation errors;
   in response to the time since an earliest data point in the sequence being below a maximum age, calculate a polynomial of lowest transmission cost for the sequence, the calculated polynomial being based on a candidate active set of data points that is set to a union of an active set of data points and new data points;
   limit an approximation error between the data points in a sequence and the calculated polynomial; and
   transmit, to the server, the calculated polynomial as compressed data, wherein the transmitted data is compressed relative to the data points received, and wherein a number of and frequency of transmissions is reduced relative to conventional GPS location reporting, thereby reducing bandwidth consumed by the data transmission and reducing database storage necessary to store the transmitted data.

9. The apparatus of claim 8, wherein when calculating a polynomial of lowest transmission cost the apparatus applies a least squares error objective.

10. The apparatus of claim 8, wherein when calculating a polynomial of lowest transmission cost the apparatus applies a constraint that the polynomial passes through one or more of the data points in the sequence.

11. The apparatus of claim 8, wherein the apparatus obtains data points in geodetic coordinates and fits the polynomials to the geodetic coordinates without transformation.

12. The apparatus of claim 8, wherein the apparatus obtains data points in geodetic coordinates and the apparatus converts the geodetic coordinates to rectangular coordinates before fitting the polynomials.

13. The apparatus in claim 8, wherein high resolution reference points for each data source are transmitted either only at the start of data collection or so as to include non-repeating data points and polynomials describe offsets from the corresponding reference point.

14. A non-transitory computer readable storage medium, comprising one or more sequences of one or more instructions which, when executed by one or more processors of an apparatus, cause the apparatus to at least:
  access data to obtain data points stored in a memory, the data points each representing a global positioning system location of a device and a time stamp at which the location was obtained;
  divide the data points into sequences of three or more consecutive data points;
  measure a time between consecutive data points in a sequence;
  in response to the time between consecutive data points exceeding a maximum time between consecutive data points in the same sequence, provide for transmission of parameters of a polynomial approximation of the data points in the sequence to a remote server to mitigate approximation errors;
  in response to the time between consecutive data points being below a maximum time between consecutive data points in the same sequence, measure a time since an earliest data point in the sequence;
  in response to the time since an earliest data point in the sequence exceeding a maximum age, provide for transmission of parameters of a polynomial approximation of the data points in the sequence to the remote server to mitigate approximation errors;
  in response to the time since an earliest data point in the sequence being below a maximum age, approximate the data points using a piecewise polynomial comprising one or more local polynomials, the piecewise polynomial being based on a candidate active set of data points set to the union of an active set of data points and new data points; and
  transmit the approximated data as compressed data to the remote server, wherein the transmitted data is compressed relative to the data points obtained, and wherein a number of and frequency of transmissions is reduced relative to conventional GPS location reporting, thereby reducing bandwidth consumed by the data transmission and reducing database storage necessary to store the transmitted data.

15. The non-transitory computer readable storage medium of claim 14, wherein the polynomial is calculated by applying a least squares error objective.

16. The non-transitory computer readable storage medium of claim 14, wherein the polynomial is calculated according to a lowest transmission cost including constraining the polynomial to pass through one or more of the data points in the sequence.

17. The non-transitory computer readable storage medium of claim 14, wherein the data points use geodetic coordinates.

18. The non-transitory computer readable storage medium of claim 17, wherein the geodetic coordinates are converted to a rectangular coordinate system before fitting the polynomials.

19. The non-transitory computer readable storage medium of claim 14, wherein a measurement in the data points comprises a control area network bus signal.

20. The non-transitory computer readable storage medium of claim 14, wherein high resolution reference points for sources of the data points are transmitted either only at the start of data collection or so as to include non-repeating data points, and polynomials describe offsets from the corresponding reference point.

* * * * *

UNITED STATES PATENT AND TRADEMARK OFFICE
CERTIFICATE OF CORRECTION

PATENT NO. : 10,122,831 B2  
APPLICATION NO. : 14/084032  
DATED : November 6, 2018  
INVENTOR(S) : Adachi et al.

Page 1 of 1

It is certified that error appears in the above-identified patent and that said Letters Patent is hereby corrected as shown below:

On the Title Page

Item (72) Inventors: "Jeffrey Adachi, El Carrito, CA (US)" should read --Jeffrey Adachi, El Cerrito, CA (US)--.

Signed and Sealed this  
Tenth Day of September, 2019

Andrei Iancu  
*Director of the United States Patent and Trademark Office*